Feb. 3, 1959 P. R. R. AIGRAIN 2,872,524
CALLING CIRCUIT IDENTIFICATION
Filed March 24, 1954
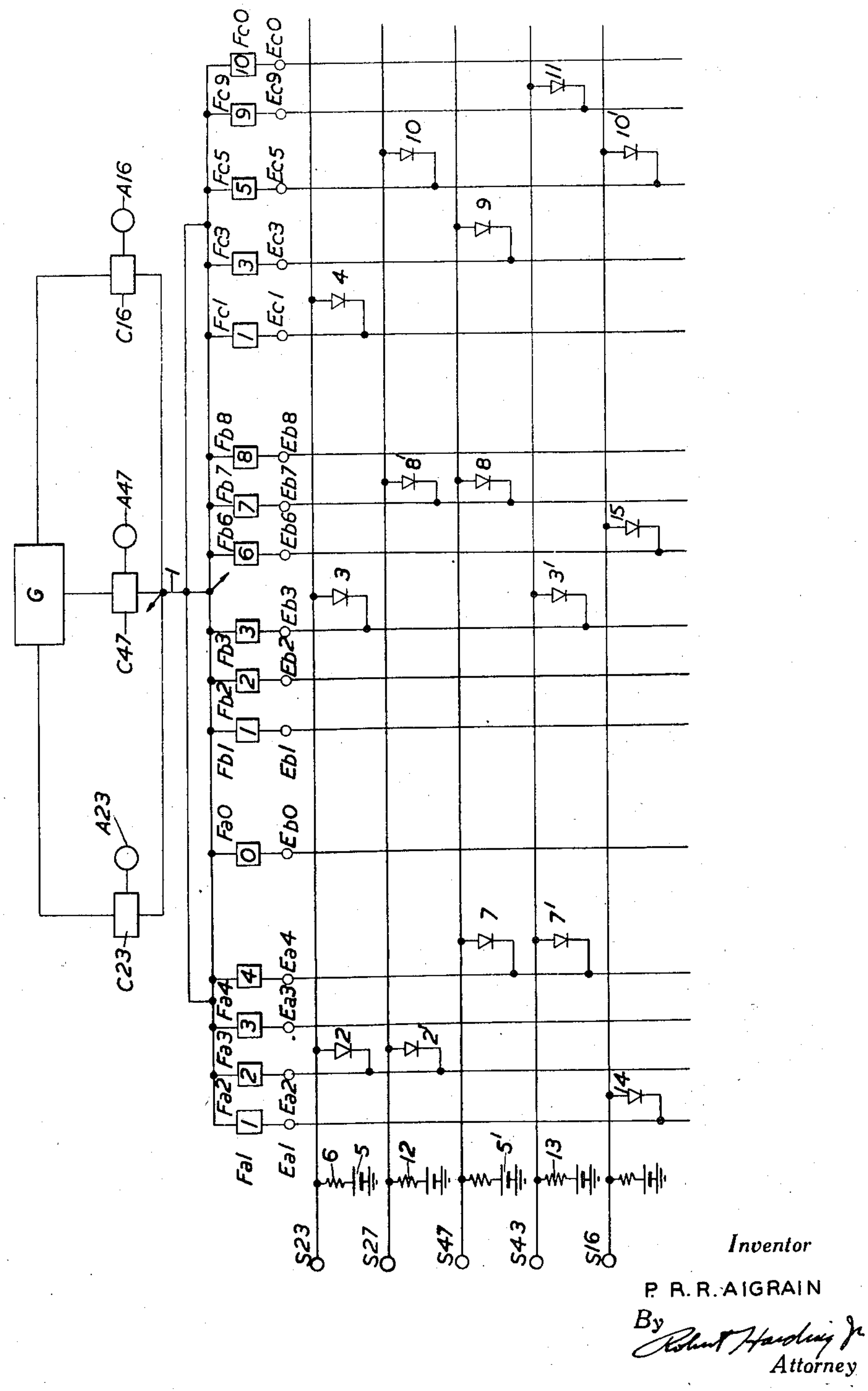
Inventor
P. R. R. AIGRAIN
By Robert Harding Jr.
Attorney United States Patent Office 2,872,524

Patented Feb. 3, 1959

2,872,524

CALLING CIRCUIT IDENTIFICATION

Pierre Raoul Roger Aigrain, Paris, France, assignor to International Standard Electric Corporation, New York, N. Y., a corporation of Delaware Application March 24, 1954, Serial No. 418,266

Claims priority, application France April 16, 1953

3 Claims. (Cl. 179—18)

The present invention relates to methods and arrangements for the identification of a calling circuit in a switching system. This invention relates more particularly to identification arrangements for calling lines in an automatic telephone system.

In automatic telephone systems and in particular in the systems of this type utilising electronic switching means, it has been proposed to characterize each calling subscriber of a group by the position of an impulse in a cycle of impulses or by a frequency chosen from a plurality of frequencies. When use is made of frequencies for characterizing the subscribers of a group comprising, for example, 100 subscribers, use must be made of 100 different frequencies. Resulting from the fact that a limitation is imposed by the relatively narrow frequency band (for example 300 to 5000 periods per second) of the cabling circuits, two adjacent frequencies differing only by 2.5% necessitate the use of generators having a stability difficult to obtain by means of low cost equipment.

It is also possible to characterize each line by means of two frequencies, each one of the two frequencies being chosen amongst 10 possible frequencies, thus obtaining 100 different characteristics with only 20 different frequencies. However if use is made of this method, one must provide a blocking device between the lines of the same group in order to avoid any ambiguity which would exist during the detection of the calls when the two groups of two frequencies characterizing two calling lines are simultaneously applied to the detection device. This drawback reduces the possibility of such a method materially.

One of the objects of the present invention is to provide a method for characterizing several calling lines in a telephone system by means of frequency combinations without any ambiguities during the identification of the line.

Another object of the present invention is to provide an arrangement in an automatic telephone system for identifying calling lines, said arrangement utilising frequency combinations for characterizing each line.

According to one of the features of the invention, a method for characterizing the circuits of a group of 100 circuits, for example, by means of frequencies, comprises the allotment to each circuit of two frequencies chosen respectively amongst two groups of 10 frequencies, for example, in agreement with the units digit and the tens digit of the order number of each circuit, assuming, for example, that the circuits are designated with increasing numbers from zero, the allotment of each circuit of a third frequency being chosen amongst a third frequency group as a function of the two frequencies already allotted, the said third frequency being chosen in order that a single frequency of the first group will correspond to each combination of a frequency of the third group and a frequency of the second group and so that a single frequency of the second group will correspond to each combination of a frequency of the third group and a frequency of the first group.

Other objects, characteristics and advantages of the present invention will appear from a reading of the following description of an embodiment, the said description being made in relation with the accompanying drawings showing under schematic form an arrangement for the detection of calling lines incorporating features of the present invention.

Reference will be made in the following description to an identification device of calling lines applied to a group of 100 lines. Use is made for characterizing subscribers' lines of 30 different frequencies divided in three groups, A, B, C, within which groups frequencies are indicated by *a*1 . . . *a*.0, *b*.1 . . . *b*.0, *c*.1 . . . *c*.0. It will be assumed that the subscribers are, for example, characterized numerically within the group by the tens digit and by the units digit of their number in the telephone directory, namely 1 to 100. A frequency of the first group *a*.1 . . . *a*.0 corresponds to each tens digit, and a frequency of the second group *b*.1 . . . *b*.0 corresponds to each units digit. The subscriber 47 is then characterized by the frequencies *a*.4, *b*.7 and the subscriber 23 by the frequencies *a*.2, *b*.3.

A third frequency is associated with each set of two frequencies allotted to a subscriber, such third frequency being chosen in the third group of frequencies in order that it fulfills one of the following relations:

$$b-a=c, \text{ if } b \text{ is greater than } a$$
$$10+b-a=c, \text{ if } b \text{ is smaller than } a$$

in which "*a*" designates, in the considered example, the tens digit, *b* the units digit, and *c* a digit allotted to each combination and to which a frequency of the third group corresponds. It will be assumed, for example, that the frequency $c_n$ corresponds to $c=n$. Thus the subscriber 47 will be characterized by the frequencies *a*.4, *b*.7, *c*.3. It is the same for the subscriber 23 who will be characterized by the frequencies *a*.2, *b*.3, *c*.1. When the two subscribers 23 and 47 call simultaneously, the frequencies *a*.2, *b*.3, *c*.1, *a*.4, *b*.7 and *c*.3 are simultaneously transmitted to the device for the detection of calls and identification of calling subscribers. It is easy to see that if the two groups of frequencies *a*.1 . . . *a*.0 and *b*.1 . . . *b*.0 were used, there would be an ambiguity about the identification of calling subscribers resulting from the fact that the identification device could not distinguish the groups *a*.4, *b*.7; *a*.2, *b*.3; *a*.4, *b*.3; *a*.2, *b*.7 which correspond to two calling subscribers. The use of a third frequency *c* determined by one of the above relations suppresses the ambiguity. Use could obviously be made of a third frequency *c* determined by a different law, provided this law fulfills the following conditions.

(1) For each different combination of "*a*" and "*b*" having the same value of "*a*" there is a different value of "*c*."

(2) For each different combination of "*a*" and "*b*" having the same value of "*b*" there is a different value of "*c*."

Fig. 1 shows an identification device for calling subscribers incorporating the present invention. Three subscribers A.23, A.47 and A.16, have been represented, each subscribers station being shown schematically by a circle. A line circuit is associated in the central exchange with each station subscriber, which line circuit may be constituted by a switching device which closes one or several circuits when the corresponding subscriber unhooks his receiver. The line circuits of subscribers' stations A.23, A.47 and A.16 have been indicated schematically in C.23, C.47 and C.16. A generator G is provided in order to produce different frequencies A.1 . . . A.0, *b*.1 . . . *b*.0, *c*.1 . . . *c*.0. The frequencies *a*.2, *b*.3, *c*.1 are applied to the input of line circuit C.23, the frequencies *a*.4, *b*.7, *c*.3 to the input of line circuit C.47, and frequencies *a*.1, *b*.6, *c*.5 to the input of the line circuit C.16. Likewise each circuit of the other subscribers of the group receives three frequencies from the generator G. Each line circuit comprises, as has been mentioned above, a switching device which can be electromechanical or electronic, and which permits the passage towards conductor 1, common to all the line circuits, of the three frequencies applied to the input of the line circuit when the corresponding subscriber unhooks his receiver.

The conductor 1 is connected at the input of circuits F*a*.0 . . . F*a*.1, F*b*.0 . . . F*b*.1, F*c*.0 . . . F*c*.1. Each one of these circuits F*a.n* for example, has a filter tuned to the frequency *a.n*, followed by a detector, and the voltage obtained at the output of the detector is applied to the input of a matrix of rectifiers having 30 inputs and 100 outputs. To simplify the figure, five inputs only of the first group have been represented, six inputs of the second group, five inputs of the third group. Likewise, five outputs only of the matrix of rectifiers have been represented and indicated as S.23, S.27, S.43, S.47, S.16. It will be assumed first of all that the subscriber A.23 unhooks his receiver. The frequencies *a*.2, *b*.3, *c*.1 are then applied by the line circuit C.23 to conductor 1, and the output potentials, positive in the considered example, appear on the input terminals E*a*.2, E*b*.3 and E*c*.1 of the matrix of the rectifiers which are normally held at a negative potential with respect to the potential of the battery 5 connected to the terminal S.23 by a resistance 6. The rectifiers 2, 3, 4 are then blocked, and the potential of the output terminal S.23 becomes the positive potential of the battery 5, indicating that the subscriber S.23 wants to originate a call.

This information can then be used, for example for controlling the switching operations which lead to the connection of the calling subscriber to a register circuit.

It is easy to understand that, if the subscriber A.47 takes off his receiver, the frequencies *a*.4, *b*.7 and *c*.3 appear on the conductor 1, causing the setting up of a positive potential on the input terminals E*a*.4, E*b*.7 and E*c*.3 of the matrix of rectifiers. The rectifiers 7, 8, 9 are then blocked, and the potential of the terminal S.47 then rises to the positive potential of battery terminal 5′, indicating that the subscriber A.47 wants to originate a call.

If the subscribers A.23 and A.47 call at the same time, only the output terminals S.23 and S.47, characteristic of the calling subscribers, are at the positive potential. In that case, there cannot be any ambiguity between the subscribers A.23, A.47, A.27, A.43 because of the fact that if the rectifiers 2′, 8′, 3′, 7′ have a high impedance, the rectifiers 10 and 11 have a low impedance, so that the terminals S.27 and S.43 are maintained at a negative potential with respect to terminals S.23 and S.47 due to the current traversing the resistances 12 and 13.

An ambiguity may happen in some cases when three subscribers want to originate a call at the same time. This is the case, for example, for the subscribers A.23, A.47, and A.16. In this case the frequencies *a*.2, *b*.3, *c*.1, *a*.4, *b*.7, *c*.3; and *a*.1, *b*.6, *c*.5 are applied to the corresponding filters, and positive potentials appear at S.23, S.47 and S.16. However a positive potential also appears at terminal S.27, since this subscriber is characterized by frequencies *a*.2, *b*.7, *c*.5. As a matter of fact, in this case the rectifiers 2, 3, 4, 2′, 8′, 10, 7, 8, 9, 7′, 3′, 14, 15, 10′ have a high impedance. This ambiguity has the effect of controlling the connection to a register of a line circuit which does not correspond to a calling subscriber. However, as in such a system of identification, the interval of time necessary for the identification is very short, the probability for three subscribers in the characteristics frequencies to form a group presenting an ambiguity is very small.

While the principles of the invention have been described above in connection with specific embodiments and particular modifications thereof, it is to be clearly understood that this description is made only by way of example and not as a limitation on the scope of the invention.

What is claimed is:

1. A calling line identification system comprising a plurality of lines, line circuits connected to said lines, a common conductor, means for generating a plurality of frequencies arranged in groups, means in each line circuit for applying a frequency from each group generated by said generating means to said common conductor when the line associated with said line circuit is calling, the combination of frequencies thus applied being different for each line circuit, a matrix of rectifiers having independent inputs corresponding respectively to said frequencies and a plurality of outputs there being one for each line, means for applying a potential to an input when the frequency corresponding to that input appears on said common conductor, and means so connecting the rectifiers of said matrix between said inputs and outputs that when a plurality of lines are calling causing a plurality of groups of frequencies to appear simultaneously on said conductor, only the outlets corresponding to said calling lines will have a potential applied thereto.

2. A calling line identification system, according to claim 1, in which the number of lines does not exceed 100 and there are first, second and third groups of frequencies with 10 frequencies in each group, one for each digit and in which the means in each line circuit for applying a frequency from each group to the common conductor when the line associated with said line circuit is calling applies a frequency from each of the first and second groups corresponding to the digits in the number of the line and applies a frequency from the third group in accordance with the following rule: for each different combination of a frequency from the first group and a frequency from the second group having the same first-group frequency, a different frequency from the third group is used; and for each different combination of a frequency from the first group and a frequency from the second group having the same second-group frequency, a different frequency from the third group is used.

3. A calling line identification system, according to claim 1, in which the number of lines does not exceed 100 and there are first, second, and third groups of frequencies with 10 frequencies in each group, one for each digit, and in which the means in each line circuit for applying a frequency from each group to the common conductor when the line associated with said line circuit is calling applies a frequency from each of the first and second groups corresponding to the digits in the number of the line and applies a frequency from the third group in accordance with the following rule: if the first digit of the number is less than the second digit, then the third frequency is that frequency corresponding to the difference between the second and first digit; if the first digit of the number is greater than the second digit, then the third frequency is that frequency which corresponds to 10 plus the difference between the second and first digits.

References Cited in the file of this patent

UNITED STATES PATENTS 2,672,518 Holden et al. ---------- Mar. 16, 1954